July 22, 1969             W. G. ELLIOTT             3,457,416
OPTICAL COMMUNICATIONS SYSTEM FOR TRANSMITTING
TWO-DIMENSIONAL IMAGES
Filed June 2, 1967

*INVENTOR.*
WILLIAM G. ELLIOTT
BY
Weingarten, Greenbach & Lahive
ATTORNEYS

United States Patent Office 3,457,416
Patented July 22, 1969

3,457,416
OPTICAL COMMUNICATIONS SYSTEM FOR TRANSMITTING TWO-DIMENSIONAL IMAGES
William G. Elliott, Baker Bridge Road, Lincoln, Mass. 01773
Filed June 2, 1967, Ser. No. 643,208
Int. Cl. H04b 9/00
U.S. Cl. 250—199          9 Claims

ABSTRACT OF THE DISCLOSURE

A system for transmitting two-dimensional images from one point to another by dispersing a beam of electromagnetic radiation simultaneously along two coordinates as a function of wavelength and intensity modulating this dispersed radiation beam as a function of position. After modulation the dispersed radiation is recollected into a beam and transmitted to the point of reception, where it is again dispersed according to the same function of wavelength to recreate a two-dimensional dispersion which has been intensity modulated according to position.

FIELD OF THE INVENTION

This invention relates in general to optical communications and more particularly to a system for transmitting two-dimensional images by means of modulating a transmitting electromagnetic beam.

BACKGROUND OF THE INVENTION

The transmission of visible two-dimensional images from one point to another is a well-developed art. The basic optical systems for transmitting these images consist of means for transmitting a beam of light maintaining the individual rays which make up the beam in a fixed spatial relationship to one another. The variation of light intensity in the cross-section of the beam provides then the information which is being transmitted to form an image at the receiver. The receiver is usually formed of a screen, film or other means of presenting the image to a viewer. In such a system any change in the spatial relationship of the rays making up the beam produces distortion in the image received. Thns when the beam is transmitted through a medium which produces some scattering, such as air containing dust or moisture, the resulting image is distorted. Even fhere the amount of scattering in the transmitting medium is relatively small, its effect is cumulative and hence it acts as a limitation on the distance over which the image may be transmitted without distortion.

One method for avoiding the problems inherent in this type of optical transmission is described in United States Letters Patent 2,443,258 and 3,192,825. In both these patents there is described a system in which a point source of substantially white light is dispersed along an axis by means of a prism. The light source thus becomes a line of light along a coordinate with the light at each point along the coordinate having a different wavelength. When this line of light is passed through a transparency of the image to be transmited, then the light intensity at each point across the coordinate is modulated in accordance with the transparency of the image at that same point. Because the light at different points along the coordinate is of different wavelengths, the effect is that the intensity of the light at each wavelength is modulated according to the transparency of the image at the corresponding position along the coordinate. This line of light is then swept along the other coordinate across the image, or the image is moved across the line of light and all the resultant light transmitted through the image is recollected and sent out as a generally integrated beam to the receiver. At the receiver an identical prism arrangement is used to disperse the incoming light once again along the coordinate to produce a line of light having precisely the same spectral-positional relationship. By sweeping this line of light across an imaging screen or film in synchronism with the sweeping action at the transmitting station, then the two-dimensional image is produced. In this system the beam of light carries the information in terms of an intensity modulation of the spectral components of the beam and hence distortion of the spatial relationship of the rays within the beam does not produce any distortion of the image. For the most part mediums through which the light beam may be transmitted do not change the spectral composition of the light beam and hence do not produce significant distortion of the image. Using such a system images may be transmited through relatively highly scattering mediums and, indeed, the light beam may be reflected off an intermediate surface such as a cloud layer so that direct line of sight between transmitter and receiver is not necessary.

While the system described in these patents is an improvement over the basic optical systems, it requires a time period to transmit the two-dimensional image, since the information constituting the second coordinate of the image is transmitted as a time function, and it also requires the transmission of a synchronizing signal. The synchronizing signal is necessary in order that the time function generated at the receiver be in sychronism with the time function generated at the transmitter. One method of doing this is to select a specific wavelength of light and transmit the synchronizing signal as an intensity modulation at this wavelength. Both of these problems, however, present some limitations in terms of the limitation of band width and complexity of the apparatus.

SUMMARY OF THE INVENTION

Broadly speaking, the communications system of this invention employs a point source of substantially white light such as a xenon arc lamp, together with a special spectrometer unit which disperses this light along two coordinates forming a generally rectangular field of light. The light is dispersed along both coordinates as a function of wavelength and thus the light at any particular point in the field is characterized by a specific wavelength. A transparency of the image to be transmitted is placed in the focal plane of the output light from the spectrometer and the light passed through this transparency is then reintegrated into a beam of substantially white light and transmitted. At the receiver the incoming beam is focused onto a spectrometer precisely the same as the dispersing spectrometer in the transmitter and the output light from this receiver spectrometer is then imaged upon a film, screen or other viewing means. The spectrometer in the transmitter provides for a positional distribution of light as a function of wavelength. The transparency provides for intensity modulation of this light as a function of position and the light signal transmitted is then intensity modulated as a function of wavelength. At the receiver the spectrometer reverses the translation, generating from the wavelength information the spatial relationship so that the output image is again intensity modulated as a function of position. Since the image transmitted is independent of the spatial relationship of the light rays during transmission, the system may be used with a highly scattering medium and may also be used in transmission without direct line of sight. The transmission may be accomplished either by using conventional optics to project a beam or by coupling the image from the transmitter into fibre optics which then transmit the image to the receiver. Since the only conversion involved is a spectral function to a positional function, there is no time function involved and extremely wide band widths are obtainable. Thus such a sys-

DESCRIPTION OF THE PREFERRED EMBODIMENTS

Figure 1:
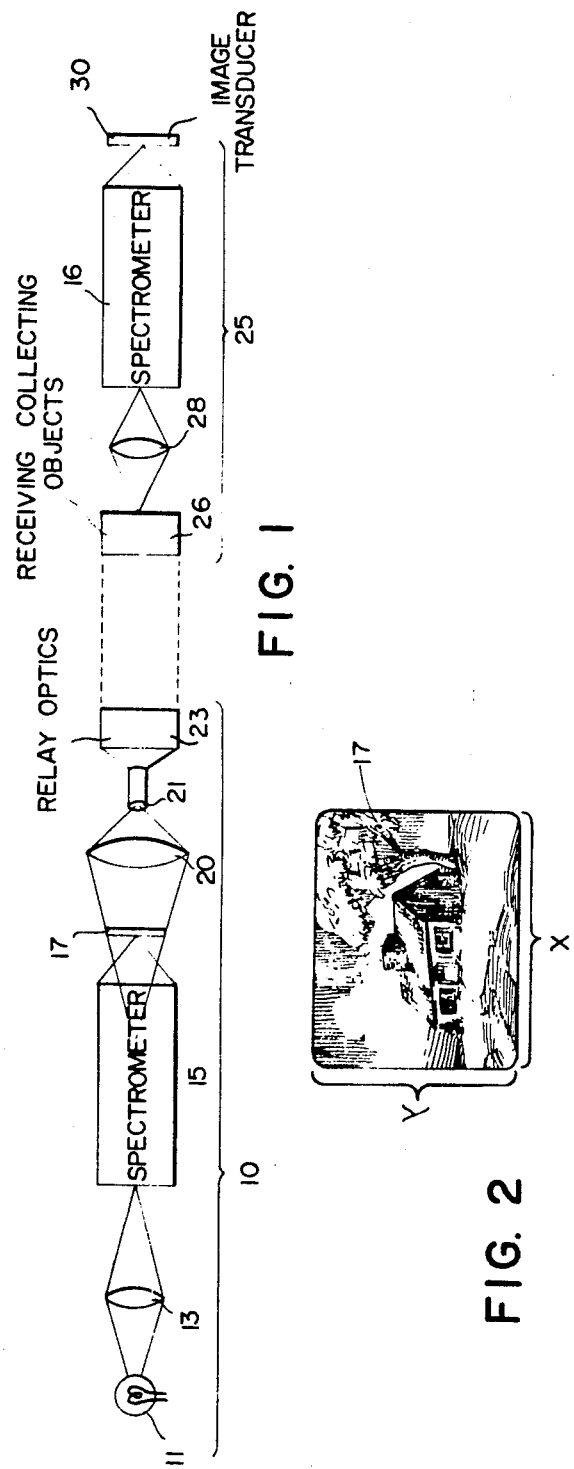
FIG. 1 is an illustration in block diagrammatical form of an optical communications system constructed in accordance with the principles of this invention.
Figure 2:
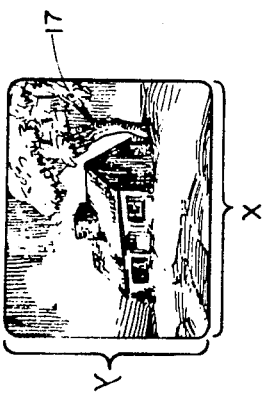
FIG. 2 is an illustration of a modulated light field forming the image to be transmitted in a communications system constructed in accordance with the principles of this invention.

With reference now to FIG. 1, there is shown in diagrammatic form an embodiment of the communication system of this invention. A relatively high intensity lamp 11, which typically could be a xenon flash lamp, constitutes a source of substantially white light. Condensing optics 13 are used to focus the light from lamp 11 onto the initial dispersing element of a spectrometer 15. As will be discussed in more detail below, the spectrometer 15 is a special type which provides for dispersion of the light along two coordinates as a function of the light wavelength, producing at the output focal plane of the spectrometer a generally rectangular light field in which the wavelength of the light rays making up the light field varies as a function of position in the field. The image to be transmitted, in the form, for example, of a transparency 17, is placed at the output focal plane of the spectrometer 15. In some instances it may be advantageous to modify the energy distribution of the light field at the focal plane prior to transmission through the image transparency 17. Thus a nonwhite light source may be corrected or the spectrum may be changed to compensate for optical properties of the system or the medium through which the image is to be transmitted. The light transmitted through the transparency 17 is intensity modulated according to the image in the transparency. Turning to FIG. 2 there is shown a typical transparency 17 forming an image extending along two coordinates X and Y. Referring again to FIG. 1, a second set of condensing optics 20 re-collects the light which has passed through the transparency 17. This condensing optics 20 forms an image of the exit aperture of the dispersing system such that the light emerging from the second set of condensing optics 20 is essentially white light, except for the intensity modulation arising from the transparency. The condensing optics 20 focuses the light onto a diffusing element 21 which tends to destroy the angular relationships between light rays from various positions in the output light field. These angular relationships are introduced in the dispersion system of the spectrometer 15 and should be eliminated in order to transmit the signal. In order for the overall system to function well the spectrometer 15 must introduce only a very small angular deviation. The diffusing element 21 may be a simple diffuser, a cone channel condenser, or fiber optics.

The diffused light at the output of diffusing element 21 is transmitted via relay optics 23 to a receiving system 25 at a remote point. The relay optics 23 may take the form of a conventional optical system for transmitting a beam of light, or alternatively, may provide for the coupling of the diffused light energy through a closed system such as a polished light pipe or fiber optics to the receiver 25.

At the receiver 25, a collecting optics system 26 focuses the incoming light beam through condensing optics 28 onto the input aperture of the second spectrometer unit 16. The second spectrometer unit 16 is substantially identical to the first spectrometer unit 15 in terms of providing an output light field dispersed along two coordinates as a function of the wavelength of the incoming light, with the functional relationship between position in the field and wavelength being the same as that of the first spectrometer 15. At the output focal plane of the second spectrometer 16 is placed an image transducer 30, such as a photographic film or image tube, or any apparatus for sensing the spatial intensity distribution of the light.

Figure 3:
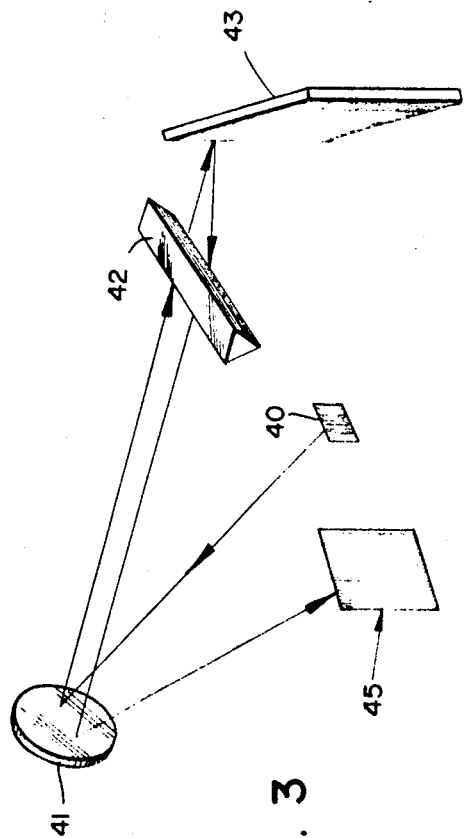
FIG. 3 is an illustration in diagrammatical form of a type of spectrometer useful in communications systems constructed in accordance with the principles of this invention.

In operation, the generally white light from the lamp 11 is dispersed over a plane by the action of the spectrometer 15. The spectrometer 15 must be a special light dispersion system which disperses light on two coordinates as a function of its wavelength. Additionally, the angular deviation at the output focal plane between rays of different wavelengths must not be too great to prevent effective condensing of this light back into substantially white light after it has passed through the transparency forming the image. In FIG. 3 there is illustrated in block diagrammatical form a spectrometer system suitable for performing this function. Light from the lamp 11 is focused on an entrance aperture 40. This aperture has a specific length on one coordinate. The length would normally be about equal to the width of the aperture. The light passed through this aperture 40 is incident on an off-axis parabolic reflector 41 which directs it onto a prism 42. The prism 42 is arranged to disperse the light along a first coordinate extending in the direction of the length of the aperture slit 40. The dispersed light from the prism 42 is incident on an echelle grating 43 which is set so that the blazed groove faces on the grating are perpendicular to the first coordinate along which the light is dispersed from the prism 42. The light reflected from the groove faces of the grating 43 is returned through the prism 42 onto the parabolic reflector 41 from which it is reflected back to an exit focal plane 45.

Such a configuration produces at the exit focal plane 45 a light field composed of a series of light rays dispersed along two coordinates with the light at any portion of the field being a different wavelength than the light at the other portions. In a specific dimensional arrangement, for example, the prism 42 might be formed as a 60° prism of calcium fluoride. The echelle grating 43 can be blazed at a blaze angle of 63° with 73.25 grooves per millimeter. If the focal length of the optics is made one meter, then such an arrangement can produce a reciprocal dispersion of 1.4 angstroms per millimeter at a wavelength of 5,000 angstroms. Under these conditions, a light field at the exit focal plane can be produced which is approximately 4" by 5" and which covers a spectral range from 1500 to 6000 angstroms.

With a spectrometer of the type described the light field at the exit focal plane has a positional distribution of light which is a function of wavelength. That is, the light at each different position in the field is of a different wavelength. When this light field is impressed upon a transparency of the type illustrated in FIG. 2, the light transmitted through the transparency is intensity modulated and, because of the relationship between wavelength and position, the light passed through the transparency may be recollected yet it retains the effect of the intensity modulation which is now carried in the recollected light beam as intensity modulation as a function of wavelength. Under these circumstances, effects such as scattering or reflecting the light from an intermediate surface, which destroy the geometric spatial relationship of the light rays within the beam do not effect the information which carries the image. This is now independent of the spatial relationship of the light rays. By utilizing a similar dispersion system in the receiver spectrometer 16, the positional relationship between the light rays which existed at the exit focal plane of the transmitting spectrometer 15 can be recreated at the exit focal plane of the receiver spectrometer 16. Since the intensity modulation was retained by virtue of the spectral relationships, then this output light field from the receiver spectrometer 16 has been intensity modulated and the image information is retained.

While the invention has been described in terms of a specific spectrometer configuration, other spectrometer configurations which produce a two coordinate dispersion may be utilized. To consider, for example, the most obvious alternative, the grating and prism position might be reversed within the spectrometer so that the light is first dispersed by the grating and then by the prism. In this instance the light dispersed from the prism would presumably be focused directly onto the exit focal plane. The intensity modulation has been described in terms of a photographic transparency placed in the focal plane at the output of the transmitting spectrometer 15. It is apparent that any means of intensity modulating the light field at the output focal plane of this spectrometer 15 as a function of position will serve to generate an image which may be transmitted.

The invention having been described, improvements and variations will now occur to those skilled in the art and the invention disclosed herein should be construed as limited only by the spirit and scope of the appended claims.

What is claimed is:
1. An optical communications system for transmitting an image from one point to a second point remote from the first comprising,
   a point source of electromagnetic radiation producing radiation having a range of spectral energies;
   first dispersion means for dispersing incident radiation along first and second coordinates as a function of wavelength generating thereby a two-dimensional radiation field wherein radiation at differing positions has different wavelengths, said first dispersion means being positioned to receive at least a portion of the radiation emitted from said radiation source;
   means for intensity modulating said generated radiation field as a function of position within said radiation field;
   radiation collecting means for forming said radiation field into a generally integrated radiation beam for transmission by said transmitting means;
   means for transmitting said intensity modulated radiation from said radiation field into said second dispersion means;
   second dispersion means located at a point remote from said first dispersion means, said second dispersion means dispersing radiation incident upon it along two coordinates as a function of wavelength, the dispersion function being substantially identical to the dispersion function of said first dispersion means;
   and an image transducer for receiving radiation dispersed from said second dispersion means and generating therefrom the image formed by said intensity modulation of said radiation field generated by said first dispersion means.

2. An optical communication system in accordance with claim 1 wherein said first and second coordinates are normal to one another and said radiation field is substantially rectangular.

3. An optical communications system in accordance with claim 1 wherein said radiation source is a source of polychromatic light.

4. An optical communications system in accordance with claim 3 wherein said first and second coordinates are normal to one another and said light field is substantially rectangular.

5. An optical communications system in accordance with claim 3 wherein said intensity modulation is generated by placing a transparency of the image to be transmitted between said generated light field and said transmitting means.

6. An optical communications system in accordance with claim 3 and further including a diffusing element for destroying the angular relationship between light rays at different positions within said light field generated by said first dispersion means.

7. An optical communications system in accordance with claim 3 wherein said first dispersion means comprises a spectrometer comprising a prism for dispersing light incident thereon along one coordinate in accordance with the wavelength of said light and a grating for dispersing light along a second coordinate in accordance with its wavelength, said second coordinate being normal to said first coordinate.

8. An optical communications system in accordance with claim 7 wherein said second dispersion means is substantially identical to said first dispersion means.

9. An optical communications system in accordance with claim 8 wherein said light field includes wavelengths within a range of 1,200 to 20,000 angstroms.

References Cited
UNITED STATES PATENTS

| 3,034,398 | 5/1962 | Barnes | 350—168 |
| 3,191,487 | 6/1965 | Kruythoff | 350—168 |

ROBERT L. GRIFFIN, Primary Examiner

ALBERT J. MAYER, Assistant Examiner

U.S. Cl. X.R.

178—6; 350—168